US011339350B2

(12) United States Patent
Pasanen et al.

(10) Patent No.: US 11,339,350 B2
(45) Date of Patent: May 24, 2022

(54) PROCESS FOR PRODUCING FREE FATTY ACIDS

(71) Applicant: Neste Oyj, Espoo (FI)

(72) Inventors: Jukka-Pekka Pasanen, Porvoo (FI); Annika Malm, Porvoo (FI); Rami Piilola, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/955,913

(22) PCT Filed: Dec. 17, 2018

(86) PCT No.: PCT/FI2018/050934
§ 371 (c)(1),
(2) Date: Jun. 19, 2020

(87) PCT Pub. No.: WO2019/122519
PCT Pub. Date: Jun. 27, 2019

(65) Prior Publication Data
US 2020/0392426 A1 Dec. 17, 2020

(30) Foreign Application Priority Data
Dec. 22, 2017 (FI) .................................. 20176150

(51) Int. Cl.
C11C 1/04 (2006.01)
C10G 3/00 (2006.01)
C11C 1/10 (2006.01)

(52) U.S. Cl.
CPC ................ C11C 1/04 (2013.01); C10G 3/50 (2013.01); C11C 1/10 (2013.01)

(58) Field of Classification Search
CPC ................ C11C 1/04; C11C 1/10; C10G 3/50
See application file for complete search history.

(56) References Cited

U.S. PATENT DOCUMENTS

| 8,420,349 | B2* | 4/2013 | Kralovec | C12P 7/6445 |
| | | | | 435/41 |
| 9,222,112 | B2* | 12/2015 | Apt | C12P 7/6427 |
| 2010/0155296 | A1 | 6/2010 | Aves et al. | |
| 2010/0286453 | A1 | 11/2010 | Hoffmann et al. | |
| 2011/0179699 | A1 | 7/2011 | D'Addario et al. | |
| 2013/0102802 | A1* | 4/2013 | Sathish | C10L 1/026 |
| | | | | 554/19 |
| 2013/0310620 | A1* | 11/2013 | Kaines | C10G 3/47 |
| | | | | 585/733 |

FOREIGN PATENT DOCUMENTS

| RU | 2324727 C1 | 5/2008 |
| WO | 2005005584 A1 | 1/2005 |
| WO | 2013104660 A1 | 7/2013 |
| WO | 2014201001 A1 | 12/2014 |
| WO | 2015181749 A1 | 12/2015 |

OTHER PUBLICATIONS

Office Action datefd Sep. 1, 2020, by the Canadian Patent Office in corresponding Canadian Patent Application No. 3,085,249. (4 pages).
Finnish Search Report dated Apr. 20, 2018.
International Preliminary Report on Patentability (PCT/IPEA/409) dated Dec. 6, 2019, by the Patent Office as the International Searching Authority for International Application No. PCT/FI2018/050934.
International Search Report (PCT/ISA/210) dated Mar. 6, 2019, by the Finnish Patent Office as the International Searching Authority for International Application No. PCT/FI2018/050934.
Kreps et al., "Influence of industrial physical refining on tocopherol, chlorophyll and beta-carotene content in sunflower and rapeseed oil", Eur. J. Lipid Sci. Technol. 2014, 116, pp. 1572-1582.
Written Opinion (PCT/ISA/237) dated Mar. 6, 2019, by the Finnish Patent Office as the International Searching Authority for International Application No. PCT/FI2018/050934.

* cited by examiner

Primary Examiner — Yate' K Cutliff
(74) Attorney, Agent, or Firm — Buchanan Ingersoll & Rooney PC

(57) ABSTRACT

A process for producing free fatty acids from oil containing chlorophyll is disclosed. Exemplary processes include blending oil containing chlorophyll with fats, followed by hydrolysis and distillation.

18 Claims, No Drawings

PROCESS FOR PRODUCING FREE FATTY ACIDS

FIELD OF THE INVENTION

The present invention relates to processing of oil comprising chlorophyll. In particular the invention relates to production of free fatty acids free of impurities from oil comprising chlorophyll, such as algal oil.

BACKGROUND

Chlorophyll containing oils, such as algal oil, are promising sources of renewable hydrocarbons. Algal oil differs from many vegetable oils and animal fats in that it contains large amounts of chlorophyll. In addition algal oils typically contain high amounts of chlorine, metals and phosphorus. Major amount of nitrogen present in algal oil is found in the chlorophyll, contrary to nitrogen present in typical vegetable oil where nitrogen is primarily present in amino acids. Chlorophyll composes of four membered porphyrin ring that is highly stable and has a high molecular mass. Because of its high molecular mass chlorophyll or its degradation products that still have a high molecular mass are known to cause plugging of catalyst or adsorbent pores and coking of the catalyst surfaces leading to catalyst deactivation. Therefore, when oils rich in chlorophyll are used in industrial processes such as fuel production, chlorophyll needs to be removed prior to catalytic processing.

Previous technologies to remove chlorophyll include adsorptive treatment with different clays, enzymatic disruption of the chlorophyll ring structure, strong acid treatment, and membrane filtration. These technologies have typically been designed for removal of chlorophyll from vegetable oils that contain considerably lower amount of chlorophyll than algal oils. Because of the high chlorophyll content of algal oil, these previous technologies are not feasible in industrial scale for removing chlorophyll due to increased costs and processing difficulties. Therefore, for example analytical methods sometimes used to process and analyse algal oil are not useful in production at industrial scale.

Fat splitting and distillation is known technology to process fats and oils when producing free fatty acids. In this process triglycerides are processed with water at high temperature, leading to the disruption (splitting) of the triglycerides into free fatty acids and glycerol. The resulting oil phase can be separated from the water-glycerol phase, and the free fatty acids can be separated from the oily phase by distillation.

The inventors have now found out that when using a feedstock comprising oil which has high chlorophyll content in a fat splitting and distillation process, after the splitting step the resulting water-glycerol phase and the free fatty acid phase are not sufficiently separated, and the resulting product is a emulsion, which is difficult to break.

To prevent formation of emulsions when processing oil comprising high amount of chlorophyll, previous technologies have used pre-treatment of the oil to prepare and separate free fatty acids. Previously pre-treatment methods to separate the oily phase from the water-glycerol phase have included degumming to remove emulsifying components prior to hydrolysis, acidic conditions and/or demulsifying salts during the hydrolysis, and use of organic solvents after hydrolysis. However, these solutions are not feasible in industrial scale because they involve use of chemicals that are harmful to environment and may corrode equipment used in the process. Further, it has now been seen that they do not sufficiently improve the phase separation with oil comprising high amount of chlorophyll.

An object of the present invention is to provide a processing method for oil comprising high amount of chlorophyll, which can be used to obtain free fatty acids that are simultaneously purified so that their further processing is possible and does not require expensive or complicated processing steps.

SUMMARY

According to the first aspect is provided a process for production of free fatty acids, the process comprising the steps of:
  a. Providing a feedstock comprising a blend of algal oil and fat, wherein the feedstock contains less than 50% w/w algal oil;
  b. Hydrolysing the feedstock to obtain at least an oily phase;
  c. Recovering the oily phase; and
  d. Distilling the oily phase for recovering free fatty acids contained therein.

According to an aspect is provided a process for production of free fatty acids, the process comprising the steps of:
  a. Providing a feedstock comprising a blend of oil comprising chlorophyll and fat;
  b. Hydrolysing the feedstock to obtain at least an oily phase;
  c. Recovering the oily phase; and
  d. Distilling the oily phase for recovering free fatty acids contained therein.

An advantage of the invention is that efficient hydrolysis and simple recovery of the oily phase is achieved. As the Examples indicate, the hydrolysis step alone is not yet efficient in removal of chlorophyll or its degradation products that still have an intact porphyrin ring structure. The oily phase, whose separation and recovery is made efficient by this invention, is then processed through distillation to produce free fatty acids of high quality and purity. In the recovered free fatty acids both the chlorophyll content and its degradation products and elemental impurities are considerably reduced.

Further, as the Examples indicate, if there is no pre-treatment like degumming prior to the hydrolysis, the present invention achieves simultaneous formation of free fatty acids and removal of elemental impurities from the oily phase during the hydrolysis step. Without bound by a theory this purification results from simultaneous water and glycerol washing of the oily phase and/or thermal effects.

According to the second aspect is provided a free fatty acid fraction obtained by the present process, comprising at least 95% free fatty acids having carbon number C14-C28.

According to third aspect is provided a method of producing renewable fuel comprising the steps of:
  a. Providing a feedstock comprising a blend of algal oil and fat,
  b. Hydrolysing the feedstock to obtain at least an oily phase;
  c. Recovering the oily phase;
  d. Distilling the oily phase for recovering the free fatty acids contained therein; and
  e. Subjecting the recovered free fatty acids to chemical reactions to generate hydrocarbons or alkylesters of fatty acids, wherein the free fatty acids are optionally used as: a co-feed in fuel production, as the only feed in fuel production, and/or the fuel obtained from the free fatty acids is used in a blend with another fuel;

whereby renewable fuel is produced.

According to another aspect is provided a method of producing renewable fuel comprising the steps of:
a. Providing a feedstock comprising a blend of: oil comprising chlorophyll and fat,
b. Hydrolysing the feedstock to obtain at least an oily phase;
c. Recovering the oily phase;
d. Distilling the oily phase for recovering the free fatty acids contained therein; and
e. Subjecting the recovered free fatty acids to chemical reactions to generate hydrocarbons or alkylesters of fatty acids, wherein the free fatty acids are optionally used as: a co-feed in fuel production, as the only feed in fuel production, and/or the fuel obtained from the free fatty acids is used in a blend with another fuel;
whereby renewable fuel is produced.

In an embodiment in the present process and method in the oil comprising chlorophyll, such as algal oil, the total content of free fatty acids, monoglycerides, diglycerides and triglycerides as analysed by ISO 15304M-2002 is lower than 90% w/w;

The method is advantageous in that it effectively and economically utilises oil comprising high amount of chlorophyll as a source of renewable feedstock. With the present method, catalytic conversion of the free fatty acids is possible because of the high quality and purity of the obtained product. Thus, problems relating to catalyst blocking and inactivation can be avoided.

According to the fourth aspect is provided a method of removing chlorophyll from a feedstock comprising:
a. Providing a feedstock comprising a blend of algal oil and fat, wherein the feedstock contains less than 50% w/w algal oil;
b. Hydrolysing the feedstock to obtain at least an oily phase;
c. Recovering the oily phase; and
d. Distilling the oily phase.

According to the another aspect is provided a method of removing chlorophyll from a feedstock comprising:
a. Providing a feedstock comprising a blend of oil comprising chlorophyll and fat;
b. Hydrolysing the feedstock to obtain at least an oily phase;
c. Recovering the oily phase; and
d. Distilling the oily phase.

In an embodiment the steps of the above methods and processes are carried out in the indicated sequence starting from the step a.

DETAILED DESCRIPTION OF THE INVENTION

As used herein, the term "comprising" includes the broader meanings of "including", "containing", and "comprehending", as well as the narrower expressions "consisting of" and "consisting only of".

In an embodiment at least one component of the composition of the invention has a different chemical, structural or physical characteristic compared to the corresponding natural component from which the at least one component is derived from. In an embodiment said characteristic is at least one of: more uniform size or molecular weight, more homogeneous dispersion or solution, higher purity.

If the feedstock to be hydrolysed contains only oil having high chlorophyll content, such as algal oil, without blending it with fat, phase separation does not take place efficiently after hydrolysis, and an emulsion is obtained instead of separate phases. The resulting emulsion is difficult to process further at an industrial scale e.g. because of its high viscosity. Consequently, the emulsion cannot be separated without using impractical methods used in prior art, such as organic solvents or extensive centrifugation. When fat splitting is typically performed for vegetable oils and animal fats, these emulsion problems are often solved by removing phospholipids from the feed by degumming and/or bleaching. However, it has now been seen that with oils having high chlorophyll content, such as algal oil, these conventional pre-treatment methods are not efficient in preventing emulsion formation, and even algal oils with low phosphorus and, thus, low phospholipid content, leads into formation of emulsion. Without bound by any theory, it is believed that the tendency of even pre-treated, i.e., degummed and/or bleached algal oil to lead to emulsion problems is due to the non-triglyceride type components present in such oils having high chlorophyll content.

Further, the inventors have found that prior processes used to separate FFAs from e.g. animal grease or from vegetable oils are not suitable as such for processing feedstocks containing algal oil.

In an embodiment the algal oil is not pre-treated with acid.

In an embodiment the oily phase recovered in the process is distilled without additional purification and/or separation methods. In contrast to methods of prior art, with the present invention such purification/separation methods are not needed when processing algal oil.

The present process is advantageous in that it provides an efficient production of free fatty acids from oil comprising chlorophyll with high purity with respect to metals, chlorophyll and chlorophyll degradation products. During the manufacturing process, the oily phase is efficiently separated from the aqueous phase containing glycerol. Further, with the present process a solid phase can be formed during fat splitting and efficiently removed after fat splitting.

During the hydrolysis step the oily phase, which contains hydrophobic components, can be washed. The combination of hydrolysis and distillation according to the invention further enables processing the oil comprising chlorophyll into a fatty acid stream that is essentially free of chlorophyll and chlorophyll degradation products that contain an intact porphyrin ring structure. By using the present invention the resulting free fatty acids also contain a low amount of other impurities, such as elemental impurities. In an embodiment the fat that is used in the blend together with the oil comprising chlorophyll, comprises or substantially consist of animal fat, vegetable oil, or a mixture thereof.

In an embodiment the total free fatty acid, mono-, di and triglyceride content of the fat as analysed by ISO 15304M-2002 is in the level of typical vegetable oil and animal fat, i.e. >90% w/w and more preferably >95% w/w.

As the Examples indicate, common pre-treatments prior to the hydrolysis step, like degumming, do not improve the phase separation after the hydrolysis when processing algal oil.

Accordingly, in an embodiment is provided a process, which does not involve pre-treatment of the feedstock before hydrolysis. In another embodiment the process does not involve degumming. In another embodiment the process does not involve acid treatment. Omitting a pre-treatment phase is advantageous because it simplifies the process and makes it more economical.

As the Examples indicate, even if the process does not involve pre-treatment prior to the hydrolysis, a simultaneous formation of free fatty acids and removal of elemental impurities from the oily phase can be achieved during the hydrolysis step. Without being bound by a theory, this purification results from simultaneous water and glycerol washing of the oily phase and/or thermal effects.

In an embodiment the oil comprising chlorophyll comprises or consists of algal oil.

Algal oil is characterised by the total content of free fatty acids, mono-, di- and triglycerides as analysed by ISO 15304M-2002 being lower than in typical vegetable oil and animal fat, i.e. <90% w/w.

In an embodiment the unsaponifiable residue of the oil comprising chlorophyll as analysed by ISO 18609-2000 is >1% w/w and more preferably >5% w/w. In another embodiment the oil comprising chlorophyll is algal oil and it contains at least 0.5, 1, 2, 3, 4, 5, 6, or 7% w/w unsaponifiable residue. The present process is advantageous in that it allows using feedstocks that have such a high content of unsaponifiable residue which causes above discussed phase separation problem when processed with methods known in the prior art.

In an embodiment the fat comprises or substantially consist of animal fat, vegetable oil, or it is a mixture thereof. This is advantageous in the present process, because it is not restricted to a single source fat.

In another embodiment the fat comprises or substantially consist of vegetable oil.

In an embodiment the feedstock consists of oil comprising chlorophyll and fat, such as algal oil and fat.

In another embodiment the blend has 200-2000 ppm of phosphorus, preferably 220-2000 ppm.

In an embodiment the phosphorus is calculated as elemental phosphorus.

In an embodiment in the oil comprising chlorophyll the total content of free fatty acids, monoglycerides, diglycerides and triglycerides as analysed by ISO 15304M-2002 is lower than 90% w/w.

In an embodiment the fat is animal fat, vegetable oil, or a mixture thereof.

In an embodiment the feedstock contains less than 50% w/w oil comprising chlorophyll, preferably algal oil. The remaining portion of the feedstock may comprise fat, or fat and another source of hydrocarbons such as oil.

In an embodiment the feedstock contains 1-45% w/w, preferably 5-45% w/w, more preferably 5-35% w/w, or 5-15% w/w of oil comprising chlorophyll, preferably algal oil. The remaining portion of the feedstock may comprise fat, or fat and another source of hydrocarbons such as oil.

In an embodiment the feedstock contains about 10% w/w oil comprising chlorophyll, preferably algal oil. In another embodiment the feedstock contains 15% w/w, 25% w/w, 35% w/w, 45% w/w, 10-45% w/w, 10-35% w/w, 10-25% w/w, or 10-15% w/w oil comprising chlorophyll, preferably algal oil. This amount is preferred to obtain quick separation of the oily phase by settling. The remaining portion of the feedstock may comprise fat, or fat and another source of hydrocarbons such as oil.

In an embodiment the feedstock contains fat at least 90% w/w, 85% w/w, 75% w/w, 65% w/w, or 55% w/w.

In an embodiment the blend contains 50% w/w or less oil comprising chlorophyll and 50% w/w or more fat. Preferably the blend contains 10-45% w/w oil comprising chlorophyll and 90-55% w/w fat, more preferably 10-35% w/w oil comprising chlorophyll and 90-65% w/w fat, even more preferably 10-25% w/w oil comprising chlorophyll and 90-75% w/w fat, and most preferably 10-15% w/w oil comprising chlorophyll and 90-85% w/W fat.

In an embodiment the feedstock consist of the blend as defined above. In this particular embodiment the feedstock does not contain other free fatty acid sources in significant amounts.

In an embodiment the hydrolysing step is carried out in typical fat splitting conditions such as at a temperature selected from a range between 220 and 280° C. In an embodiment a residence time ranging from 1 to 90 minutes is used. In another embodiment the amount of water ranges from 10 to 60 wt-%. In yet another embodiment emulsifiers or acidic catalysts are used in the hydrolysis step.

In an embodiment hydrolysing is carried out at a temperature selected from a range between 220 and 280° C.

In an embodiment the step c. further comprises separating an aqueous phase and a solid phase.

In an embodiment the step c. comprises separating about 5% w/w solids as the solid phase.

Thus, an advantage of the present invention is that impurities can be removed simply by removing the solid phase, resulting into an oily phase which directly suitable for distillation. In particular phosphates can be removed as magnesium phosphates by removing the solid phase.

In an embodiment the oily phase recovered in step c. contains, compared to the feedstock before hydrolysis, less than 10% metals, preferably less than about 5% metals. In an embodiment the oily phase recovered in step c. contains, compared to the feedstock before hydrolysis, less than 5% phosphorus, preferably less than about 1% phosphorus. In another embodiment the oily phase recovered in step c. contains, compared to the feedstock before hydrolysis less than 10% chlorides, preferably less than about 6% chlorides.

In an embodiment the oily phase contains less than 500 ppm chlorophyll.

In an embodiment the oily phase contains less than 50 ppm phosphorus.

In an embodiment in the step d. the distilling is carried out in conditions known in the prior art, where temperature ranges between 180° C. and 280° C. and pressure between 0.1 kPa and 1.0 kPa, to recover a fraction comprising free fatty acids.

In an embodiment in the step d. the distilling is carried out at a temperature selected from the range between 220 and 300° C. and a pressure selected from the range between 0.01 and 50 kPa (given as an absolute pressure) to recover a fraction comprising free fatty acids.

In an embodiment the distilling is carried out to fractionate distinct algal oil free fatty acid fractions, i.e., fractions containing high amount of polyunsaturated fatty acids like C16:4, C18:3 and C20:5 that are typical of algal oils using methods known in the prior art.

The above distillation conditions are advantageous because they decrease the amount of remaining total chlorophyll and metals in the FFA fraction, as shown in Table 4 below.

In an embodiment the feedstock comprises at least 1000 ppm total chlorophyll.

In an embodiment the feedstock comprises at least 1500 ppm, 2000 ppm, 5000 ppm or 10000 ppm total chlorophyll.

In an embodiment the feedstock comprises at least 500 ppm total chlorophyll, preferably at least or about 600 ppm, 700 ppm, 800 ppm, 900 ppm, 1000 ppm, 1100 ppm, 1200 ppm, 1300 ppm, 1400 ppm, 1500 ppm, 2000 ppm, 5000 ppm or 10000 ppm. These embodiments are advantageous because the present process can be used for feedstock containing varying amount of chlorophyll. Thus, the present process allows variation in the amount of chlorophyll in the feedstock and is still successful in production of FFAs.

In an embodiment the feedstock comprises at least 1000 ppm phosphorus.

In an embodiment the feedstock comprises at least or about 800 ppm phosphorus, preferably at least 900 ppm, 1000 ppm, 1100 ppm, 1200 ppm, 1300 ppm, 1400 ppm, or 1500 ppm.

In an embodiment the feedstock comprises at least 1000 ppm total chlorophyll and at least 1000 ppm phosphorus.

In an embodiment the recovery in step c. is carried out by separating the oily phase from an aqueous phase and optionally from a solid phase. In an embodiment the phases are separated from each other by settling. It should be noted that when algal oil was processed otherwise according to the present invention but without blending with fat, the phases did not separate by settling after hydrolysis.

In another embodiment the phases are separated by centrifugation. Centrifugation may be advantageous in case an even faster separation of phases is desired.

In an embodiment also the solid phase is separated from the oily phase and the aqueous phase. In such a case after hydrolysis the reaction system comprises three phases: aqueous phase, oily phase and solid phase. Separation of the solid phase is advantageous and indicative of removal of elemental impurities. When these components are removed from the oily phase, impurities are removed that may be harmful e.g. for the performance of catalysts in later processing. Thus an advantage of the invention is that metal sensitive catalysts can be used to process the obtained free fatty acids.

In an embodiment the hydrolysed algal oil is washed during hydrolysis and settling.

In an embodiment at least 90% w/w of metals, phosphorus and chlorides are removed in washing. In a preferable embodiment the washing is carried out during hydrolysis and separation of the oily phase from the aqueous phase and the solid phase.

In an embodiment the aqueous phase contains glycerol.

In an embodiment distillation is carried out to obtain a free fatty acid containing fraction, which is essentially free from chlorophyll, preferably containing less than 10 ppm chlorophyll. In another embodiment the free fatty acid fraction contains less than 10 ppm metals, or it does not contain metal or metals.

In an embodiment after distillation the free fatty acid phase has a colour ranging from yellow to dark orange. This colour is indicative of removal of impurities such as chlorophyll.

In an embodiment the process is a batch process.

In an embodiment the process is a continuous process.

In an embodiment the free fatty acid fraction obtained after distillation contains <10 ppm total chlorophyll, <10 ppm metals and <10 ppm phosphorus. In an embodiment it further contains <200 ppm sulphur.

In an embodiment the free fatty acid fraction obtained after distillation is used in to manufacture renewable fuel by hydrotreating the free fatty acids as such or blended with triglycerides into n-paraffins, optionally followed by catalytic conversion into branched paraffins (i-paraffins).

In an embodiment the free fatty acid fraction is used to manufacture chemicals.

EXAMPLES

The following examples are provided to illustrate various aspects of the present invention. They are not intended to limit the invention, which is defined by the accompanying claims.

Example 1—Processing Algal Oil

Materials

Feed for test was algal oil that was obtained by hexane extraction of Nannochloropsis biomass after the biomass was dried and the cells disrupted. This is called algal oil #1. Prior to the fat splitting experiment this oil was further treated to remove any solid material, e.g., sand by diluting the oil with 3 parts heptane and centrifuging for 15 minutes. After this the heptane was evaporated in vacuum.

Procedure

Hydrolysis

Hydrolysis was performed by heating the pre-treated oil with water (1:1 mass ratio) in a 1 liter Parr reactor at 230° C. for 3 h.

After hydrolysis the water phase did not separate by settling in oven at 60° C. for ca. 45 min. The water phase could, however, be separated from the oil phase by centrifugation at 40° C./4400 rpm/15 min. Water was pipetted from the bottom of the centrifuge tube.

Some of the solids formed during hydrolysis could be separated with the water phase, but high amounts remained between oil and water phase. After separating the water phase, oil was diluted with heptane (1:1 oil/heptane) and the remaining solid material was removed by filtering the oil-heptane solution through 4-12 μm filter paper. After this the heptane was evaporated to obtain the algal oil hydrolysate.

Also the water phase that was separated after centrifugation was filtered through 4-12 μm filter paper to remove solids. After this water was evaporated from this phase under vacuum in order to obtain a dry glycerol phase.

Distillation

The distillation of algal oil hydrolysate was performed in a short-path distillation column. The temperature of the algal oil hydrolysate was 45° C. in the beginning of the distillation and it was gradually increased to 265° C. During the distillation the pressure of the distillation equipment was 2.8 mbar in the beginning and gradually lowered to 1.9 mbar.

During the distillation six separate distillate fractions were taken. The separate samples from the distillation are presented in Table 1. Both the individual fractions and a combined total distillate fraction were analysed.

TABLE 1

Separate distillate samples and the bottom sample taken during the distillation of the algal oil hydrolysate.

| | Boiling point range of the fraction in atmospheric equivalent temperature, ° C. | Percentage of the original algal oil hydrolysate |
|---|---|---|
| Distillate sample 1 | 163-311 | 1.0% |
| Distillate sample 2 | 311-355 | 15.5% |
| Distillate sample 3 | 355-372 | 13.7% |
| Distillate sample 4 | 372-377 | 18.1% |
| Distillate sample 5 | 377-381 | 6.0% |
| Distillate sample 6 | 381-384 | 2.6% |
| Bottom | >384 | 41.0% |

Analysis

Oil samples were analysed using the following methods: metals and phosphorus were analysed using ASTM D5185-13[e1], chlorides and sulphur using determination of elemental composition by QILQUANT-XRF method, nitrogen using ASTM D4629-12, chlorophyll content using AOCS Official Method Cc 13d-55 and glyceride composition using gel permeation chromatography, where the molecules are separated based on their size and molecule weight. For this gel permeation method a calibration sample is made up from DL-α-Palmitin, Dipalmitin, Glyceryl tripalmitate, Palmitic acid. Instead of this gel permeation method mono-, di- and triglycerides could be analysed using AOCS Recommended Practice Cd 11c-93 and free fatty acids by total acidic number using ISO660-2009.

Water phase was analysed using the following methods: metals and phosphorus were analysed using ICP-OES, nitrogen using SFS EN 12260, COD using ISO15705M-2002M, TOC using SFS EN1484 (1997).

The solid material separated after the hydrolysis step was analysed for its elemental composition using SEM-EDS method.

Results

The aim of hydrolysis treatment was to hydrolyse the lipids as much as possible to free fatty acids. Algal oil #1 contained initially 1% mono-, 22 di- and 70% triglycerides, 1% oligomers and 6% free fatty acids. After the hydrolysis the hydrolysed algal oil contained 3% mono-, 12 di- and 8% triglycerides, 2% oligomers and 75% free fatty acids.

This incomplete hydrolysis into free fatty acids is considered a good result in batch operation and in continuous operation a higher level of free fatty acids would be reached. This would obviously decrease the amount of the distillation bottom fraction.

After hydrolysis, oil phase, water phase and precipitate were separated as described earlier. Approximately 5% solids were formed during the hydrolysis step and the water phase contained approximately 12% water soluble material after the water was evaporated. The oil phase was significantly purified in the hydrolysis process (Table 2) due to water washing and/or thermal effects. Metals were removed by 95%, phosphorus by 99%. Chlorides were also removed effectively by 94%. The nitrogen content of the oil is reduced, but this reduction is due to the removal of small molecular size nitrogen compounds such as degradation products of amino acids.

It seems that the chlorophyll content of the oil is reduced, but actually the chlorophyll is changed in a form that cannot be detected using the spectrographic analytical method (AOCS Official Method Cc 13d-55). Although the fat splitting process has altered chlorophyll so that it cannot be analysed, the fat splitting process has not degraded the four membered porphyrin ring structure of chlorophyll that is highly stable and has a high molecular size leading to catalyst deactivation. In order to remove this high molecular weight component with a large size, the distillation step is needed.

The results after the distillation are presented in Table 3 and Table 4. Table 3 shows the analyses of the individual distillates and Table 4 shows the analyses of the bottom fraction and the combined total distillate fraction. The removal of the high molecular weight chlorophyll or chlorophyll originating components from the free fatty acid fractions can be seen from the reduction of the nitrogen content, total lack of chlorophyll as analysed by AOCS Official Method Cc 13d-55 and further from the colour of these fractions. The poor applicability of the chlorophyll method AOCS Official Method Cc 13d-55 to analyse chlorophyll after thermal processing can be seen from the chlorophyll results of the bottom, which obviously contains the high molecular weight porphyrin ring structures.

TABLE 2

Elemental impurities in feed and oily phase after hydrolysis.

| | Unit | Algal oil #1 prior to hydrolysis | Algal oil #1 after hydrolysis |
|---|---|---|---|
| Si | mg/kg | 32.5 | 1.7 |
| Al | mg/kg | 4.3 | 0.7 |
| Fe | mg/kg | 122 | 116 |
| Na | mg/kg | 1260 | 35.7 |
| Ca | mg/kg | 225 | 7.4 |
| Mg | mg/kg | 2360 | 9.5 |
| P | mg/kg | 3940 | 27.4 |
| Mn | mg/kg | 16.2 | 0.4 |
| Cl | mg/kg | 2170 | 140 |
| S | mg/kg | 2380 | 1200 |
| N | mg/kg | 6100 | 4000 |
| Total chlorophyll | mg/kg | 25633 | 414 |

TABLE 3

Analyses of the individual distillate fractions.

| | | Distillate fraction 1 | Distillate fraction 2 | Distillate fraction 3 | Distillate fraction 4 | Distillate fraction 5 | Distillate fraction 6 |
|---|---|---|---|---|---|---|---|
| N | mg/kg | 6500 | 580 | 300 | 390 | 860 | 1500 |
| Monoglyserides | % | not analyzed | 0.3 | 0.4 | 0.8 | 1.8 | 2.9 |
| Diglyserides | % | not analyzed | 0.1 | 0.1 | 0.3 | 0.8 | 1.9 |
| Triglyserides | % | not analyzed | <0.1 | <0.1 | <0.1 | <0.1 | 0.1 |
| Fattyacids | % | not analyzed | 99.6 | 99.5 | 98.9 | 97.4 | 95.1 |
| Si | mg/kg | 299.6 | 1 | 30.6 | 51.1 | 107 | 181 |
| Al | mg/kg | <0.3 | <0.3 | <0.3 | <0.3 | <0.3 | <0.3 |
| Fe | mg/kg | <0.1 | 0.3 | <0.1 | <0.1 | <0.1 | <0.1 |
| Na | mg/kg | <1.0 | 11.8 | <1.0 | <1.0 | 4.8 | 3.3 |
| Ca | mg/kg | <0.3 | 1.5 | <0.3 | <0.3 | <0.3 | <0.3 |
| Mg | mg/kg | <0.3 | 6.9 | <0.3 | <0.3 | <0.3 | <0.3 |
| Mn | mg/kg | <0.3 | <0.3 | <0.3 | <0.3 | <0.3 | <0.3 |
| P | mg/kg | 14 | 26.7 | <0.6 | <0.6 | <0.6 | <0.6 |
| S | mg/kg | not analyzed | 160 | 100 | 140 | 300 | 580 |
| Cl | mg/kg | not analyzed | 255 | 40 | 20 | 15 | 25 |
| Total chlorophyll | mg/kg | <10 | <10 | <10 | <10 | <10 | <10 |

TABLE 4

Analyses of the distillation bottom and the combined distillate fraction analyses.

| | Unit | Feed for distillation | Bottom phase | Combined distillate fractions |
|---|---|---|---|---|
| N | mg/kg | 4000 | 9000 | 631.3 |
| Al | mg/kg | 0.7 | 1.5 | <0.3 |
| Fe | mg/kg | 116 | 298 | 0.1 |
| Na | mg/kg | 35.7 | 91 | 3.9 |
| Ni | mg/kg | 11.9 | 30.3 | <0.5 |
| Ca | mg/kg | 7.4 | 15.7 | 0.4 |
| Mg | mg/kg | 9.5 | 19.6 | 1.9 |
| P | mg/kg | 27.4 | 56.3 | 7.5 |
| Zn | mg/kg | 2.7 | 3.2 | <0.5 |
| Cl | mg/kg | 140 | <10 | 88.0 |
| S | mg/kg | 1200 | 1400 | 170.2 |
| Total chlorophyll | mg/kg | 414 | <10 | <10 |

The water phase recovered after hydrolysis step contained mostly of glycerol, but also some of the metal impurities end up in the water phase (Table 5).

The solid material removed after the hydrolysis step contained mostly magnesium phosphates.

TABLE 5

Analysis results for water phase after hydrolysis.

| | | Water phase recovered after hydrolysis |
|---|---|---|
| Al | mg/kg | 0.66 |
| Fe | mg/kg | 0.95 |
| Mg | mg/kg | 990 |
| Mn | mg/kg | 4.97 |
| Na | mg/kg | 1420 |
| Ca | mg/kg | 47.7 |
| P | mg/kg | 19.3 |
| N | mg/l | 1800 |
| COD | mg/l | 130000 |
| TOC | mg/l C | 44800 |

As the Example indicates the phase separation of the 100% algal oil after hydrolysis is highly difficult. The Example also indicates that hydrolysis step is able to remove major portion of elemental impurities due to water washing and/or thermal effects as a solid material or as water soluble material. The quality of the hydrolysed oil fraction can be further increased by distilling the fatty acids, which removes the chlorophyll.

Example 2—Processing of Pre-Treated Algal Oil

In Example 1 100% algal oil #1 was used as the raw material and the phase separation after hydrolysis was seen to be difficult. Further tests to examine the effect of conventional pre-treatment on phase separation with 100% algal oil was experimented. These experiments were done using algal oil #2 that was produced as described in the chapter Materials in Example 1. For the experiments this algal oil was hydrolysed either as 100% algal oil or 100% algal oil after double degumming.

The hydrolysis of the algal oil was done described in the chapter Hydrolysis in Example 1. After the hydrolysis the separation of the phases was experimented by sedimentation in oven heated to 65 C and if no phase separation could be seen centrifugation (40° C./4400 rpm/15 min) was tried.

Degumming

The double degumming pre-treatment of the algal oil #2 was performed by heating the algal oil to 60° C., blending 4000 ppm of 50 wt-% citric acid to the algal oil using a high-speed mixing for 2 minutes and low speed mixing for 15 minutes. After this 2 wt-% of deionized water was added and the mixture was mixed for 2 minutes using a high-speed mixing for 2 minutes and low speed mixing for 60 minutes. After this the mixture was centrifuged (60° C./30 min/4300 rpm) and an oily phase was separated from the solid gums phase. In order to obtain double degumming the same procedure was done twice.

When fat splitting was performed on crude algal oil #2 it was seen that the oil and water phases were difficult to separate and even centrifugation in elevated temperatures was not able to separate all of the water from the oil.

Hydrolysis of 100 w-% twice degummed algal oil #2 did not help in the phase separation. The phase separation was extremely difficult and again centrifugation at elevated temperature was not able to separate all of the water from the oil.

These difficulties were unexpected as the twice water degummed oil contained considerably less impurities than the crude oil. Conventional fat splitting processes are usually specified to be able to handle fats with <200 mg/kg phosphorus, because higher amounts of phospholipids can increase viscosity and create emulsions. Based on this it seems that the algal oil contains some additional emulsifying components that cannot be removed by water degumming.

Example 3—Processing of Algal Oil Blended in Other Fats

Examples and 1 and 2 showed that the phase separation after hydrolysis of either 100% crude algal oil or twice degummed algal oil is highly difficult. After these experiments the hydrolysis of algal oil was tested in blends with other fats.

These experiments were done using algal oil #3 that was produced as described in the chapter Materials in example 1. For the experiments this algal oil was hydrolysed as 100% crude algal oil and blended in rendered animal fat (AF) and in a mixture of crude palm oil (CPO) and palm fatty acid distillate (PFAD) (40 wt-% CPO and 60 wt-% PFAD in the mixture). The algal oil amount in the blend with CPO/PFAD was 10 wt-% and in the AF blend 10, 50 or 80 wt-%.

The hydrolysis of the algal oil and fat blends was done as described in the chapter Hydrolysis in Example 1. After the hydrolysis the separation of the phases was experimented by sedimentation in oven heated to 65° C. and if no phase separation could be seen centrifugation (40° C./4400 rpm/15 min) was tried.

With CPO/PFAD blending tests both raw and degummed algal oils were tested. Both crude algal oil and degummed algal oil were used. The degumming was performed as described in the chapter Degumming in Example 2. The phase separation results were improved with both the crude and degummed algal oil blends and simple settling could be used to separate the two phases.

With AF blending tests only crude algal oil was tested. With 10 wt-% algal oil blend the phase separation was fast and simple settling could be used to separate the two phases.

With the 50 w-% algal oil blend the settling was not as quick, but two phases could be identified after the sample had settled at 80° C. overnight. This separation could be improved by centrifugation.

With the 80 w-% algal oil blend the settling did not lead to separation of any phases and only centrifugation was able to separate the phases.

When using 100 w-% algal oil in hydrolysis, even centrifugation was not effective in separating the phases.

In this example it was shown that fat splitting of algal oils requires blending, because of the otherwise difficult phase separation. The reason behind the difficult phase separation is unknown, but without being bound to any theory this is most likely linked to the non-fatty acid part of the algal oils that usually ranges between 15 and 40 w-%.

Different non-binding aspects and embodiments of the present invention have been illustrated in the foregoing. The above examples and embodiments are used merely to explain selected aspects or steps that may be utilized in implementations of the invention. Some embodiments and examples may be presented only with a reference to certain aspects or embodiments of the invention. It should be appreciated that the corresponding embodiments and examples may apply to other aspects and embodiments as well. Any appropriate combinations of the embodiments may be formed.

The invention claimed is:

1. A process for production of free fatty acids, the process comprising:
   a. providing a feedstock containing a blend of: algal oil and fat, wherein the feedstock contains 1-45 w/w algal oil and wherein the feedstock contains at least 1000 ppm total chlorophyll;
   b. hydrolysing the feedstock to obtain at least an oily phase;
   c. recovering the oily phase; and
   d. distilling the oily phase for recovering free fatty acids contained therein.

2. The process of claim 1, wherein in the algal oil a total content of free fatty acids, monoglycerides, diglycerides and triglycerides as analysed by ISO 15304M-2002 is lower than 90% w/w.

3. The process of claim 1, wherein the fat is at least one of animal fat, vegetable oil, or a mixture thereof.

4. The process of claim 3, wherein the feedstock is selected to contain at least one of 5-45% w/w, 5-35% w/w, or 5-15 w/w algal oil.

5. The process of claim 1, wherein hydrolysing is carried out at a temperature selected from a range between 220 and 280° C.

6. The process of claim 1, wherein the step c. of recovering comprises:
   separating an aqueous phase and a solid phase.

7. The process of claim 1, wherein in the step d. distilling, the distilling is carried out at a temperature selected from a range between 220 and 300° C. and a pressure selected from a range between 0.01 and 50 kPa given as an absolute pressure to recover a fraction containing free fatty acids.

8. The process of claim 1, wherein the feedstock contains at least 1500 ppm total chlorophyll.

9. The process of claim 1, wherein the feedstock contains at least 1000 ppm phosphorus.

10. A method of producing renewable fuel, the method comprising:
    a. providing a feedstock containing a blend of: algal oil and fat, and wherein the feedstock contains 1-45 w/w algal oil and wherein the feedstock contains at least 1000 ppm total chlorophyll;
    b. hydrolysing the feedstock to obtain at least an oily phase;
    c. recovering the oily phase;
    d. distilling the oily phase for recovering free fatty acids contained therein; and
    e. subjecting the recovered free fatty acids to chemical reactions to generate hydrocarbons or alkylesters of fatty acids, wherein the free fatty acids are suitable as at least one of: a co-feed in fuel production, as an only feed in fuel production, as fuel obtained from for a blend with another fuel; and the method including:
    producing a renewable fuel from the free fatty acids.

11. The method of claim 10, wherein in the algal oil a total content of free fatty acids, monoglycerides, diglycerides and triglycerides as analysed by ISO 15304M-2002 is lower than 90% w/w.

12. A method of removing chlorophyll from a feedstock comprising:
    a. providing a feedstock comprising a blend of: algal oil and fat, wherein the feedstock contains 1-45 w/w algal oil and wherein the feedstock contains at least 1000 ppm total chlorophyll;
    b. hydrolysing the feedstock to obtain at least an oily phase;
    c. recovering the oily phase; and
    d. distilling the oily phase.

13. The process of claim 2, wherein the fat is at least one of animal fat, vegetable oil, or a mixture thereof.

14. The process of claim 13, wherein the feedstock is selected to contain 5-15 w/w algal oil.

15. The process of claim 14, wherein hydrolysing is carried out at a temperature selected from a range between 220 and 280° C.

16. The process of claim 15, wherein the step c. of recovering comprises:
    separating an aqueous phase and a solid phase.

17. The process of claim 16, wherein in the step d. distilling, the distilling is carried out at a temperature selected from a range between 220 and 300° C., and a pressure selected from a range between 0.01 and 50 kPa given as an absolute pressure to recover a fraction containing free fatty acids.

18. The process of claim 17, wherein the feedstock contains at least 1000 ppm phosphorus.

* * * * *

UNITED STATES PATENT AND TRADEMARK OFFICE
CERTIFICATE OF CORRECTION

PATENT NO. : 11,339,350 B2
APPLICATION NO. : 16/955913
DATED : May 24, 2022
INVENTOR(S) : Jukka-Pekka Pasanen, Annika Malm and Rami Piilola It is certified that error appears in the above-identified patent and that said Letters Patent is hereby corrected as shown below:

In the Claims

Claim 1, Column 13, Line 24: that portion of the claim reading "and fat, wherein the feedstock contains 1-45 w/w algal" should read --and fat, wherein the feedstock contains 1-45 % w/w algal--

Claim 4, Column 13, Line 40: that portion of the claim reading "or 5-15 w/w algal oil" should read --or 5-15 % w/w algal oil--

Claim 10, Column 14, Line 6: that portion of the claim reading "and fat, and wherein the feedstock contains 1-45 w/w" should read --and fat, and wherein the feedstock contains 1-45 % w/w--

Claim 12, Column 14, Line 28: that portion of the claim reading "and fat, wherein the feedstock contains 1-45 w/w algal" should read --and fat, wherein the feedstock contains 1-45 % w/w algal--

Claim 14, Column 14, Line 38: that portion of the claim reading "selected to contain 5-15 w/w algal oil" should read --selected to contain 5-15 % w/w algal oil--

Signed and Sealed this
Twenty-seventh Day of December, 2022

Katherine Kelly Vidal
*Director of the United States Patent and Trademark Office*